United States Patent [19]
Boger

[11] Patent Number: 5,771,929
[45] Date of Patent: Jun. 30, 1998

[54] LOW NOISE BALL VALVE ASSEMBLY WITH AIRFOIL INSERT

[75] Inventor: Henry William Boger, Foxboro, Mass.

[73] Assignee: Dresser Industries, Inc., Dallas, Tex.

[21] Appl. No.: 736,508

[22] Filed: Oct. 24, 1996

[51] Int. Cl.[6] .................................................. F16K 47/04
[52] U.S. Cl. ..................................... 137/625.32; 251/127
[58] Field of Search ........................ 137/625.32; 251/127

[56] References Cited

U.S. PATENT DOCUMENTS

| | | |
|---|---|---|
| 4,212,321 | 7/1980 | Hulsey . |
| 4,364,415 | 12/1982 | Polon . |
| 4,479,510 | 10/1984 | Bey . |
| 4,530,375 | 7/1985 | Bey . |
| 4,540,025 | 9/1985 | Ledeen et al. . |
| 4,610,273 | 9/1986 | Bey . |
| 5,180,139 | 1/1993 | Gethmann et al. . |
| 5,218,984 | 6/1993 | Allen . |
| 5,287,889 | 2/1994 | Leinen . |
| 5,332,004 | 7/1994 | Gethmann et al. . |
| 5,400,825 | 3/1995 | Gethmann et al. . |

FOREIGN PATENT DOCUMENTS

| | | |
|---|---|---|
| 0325846 | 11/1988 | European Pat. Off. . |
| 237241 | 4/1945 | Germany . |
| 1200688 | 11/1958 | Germany . |
| 2352370 | 4/1975 | Germany . |

OTHER PUBLICATIONS

Kent Process Control Inc., *Series 61 and 62 High Performance Rotary Valves*.
Neles Control Valves For Gas Transmission and Distribution.
The Curco SoundTrim Low Noise Anti–Cavitation/Clog Free Control Plug Valve.

Primary Examiner—John Fox
Attorney, Agent, or Firm—Haynes and Boone L.L.P.

[57] ABSTRACT

A ball valve assembly and method in which a ball valve is rotatable in a conduit section to selectively permit fluid flow through the bore to control the flow of the fluid through the conduit section. An insert is disposed in the valve bore, has a plurality of small-diameter passages and defines, with a portion of the valve, a large-diameter passage extending therethrough. The valve is rotated from its closed position to a first, partially-opened position where the small-diameter passages are in the flow path of the fluid to reduce the flow rate and the noise caused by the fluid flow. The valve can be rotated to a fully-opened position in which the large-diameter passage is in the flow path of the fluid to achieve relatively high flow rates. The insert forms an airfoil surface to prevent separation of the fluid as it passes through the large-diameter passage.

9 Claims, 2 Drawing Sheets

LOW NOISE BALL VALVE ASSEMBLY WITH AIRFOIL INSERT

BACKGROUND OF THE INVENTION

The present invention relates to a low noise ball valve assembly and, more particularly, to such an assembly for controlling the transmission and distribution of a compressible fluid.

In the transmission and distribution of compressible fluids, such as natural gas, there are requirements for valves that control a variable, such as pressure or flow rate, and operate at high pure drops, that is, high pressure differences between the upstream and downstream pressure. As such, these valves are fitted with actuators and positioners that respond to a control signal generated by a controller or computer.

When a compressible fluid is throttled through a control valve at high pressure drop, noise is generated in the fluid aerodynamically, and subsequently is propagated through the fluid, exciting the pipe walls (principally downstream), and thereby causing noise to be propagated to the surrounding atmosphere. The result may be noise that exceeds allowable limits for worker hearing conservation.

A second concern involved with the throttling of a compressible fluid through a control valve is that it often causes excessive mechanical vibration resulting in attendant problems with the proper operation of associated measuring and controlling equipment. In addition, the vibration can also cause fatigue failure of welds or piping.

In this context, ball valves have frequently been used as shutoff valves and control valves in the transmission and distribution of natural gas. However, the availability of valve trim for ball valves that offers good noise reduction has been very limited. Also, the ball valves that do have noise reduction capability are often limited to applications in which there is a high pressure drop throughout the entire range of travel of the valve. In these cases the valve can be designed for continuous noise reduction over the entire range of travel. However, there are applications that involve a relatively high pressure drop at relatively low flow rates and small valve openings, and a relatively low pressure drop at maximum flow and relatively large valve openings. In the latter, low pressure drop, situation, a flow capacity is required that is higher than would be possible utilizing a valve designed for continuous noise reduction based on a high pressure drop throughout the entire valve travel range.

Also, many of the ball valves having noise reduction capability cause separation of the gas flow as it passes through the valve which results in losses in pressure drop which compromises the performance of the valve.

Therefore what is needed is a ball valve with noise reduction capability that can reduce noise at relatively low flow rates and small valve openings at relatively high pressure drops, yet respond to relatively low pressure drop situations and achieve maximum flow. Also, what is needed is a ball valve of the above type which eliminates flow separation of the gas as it passes through the valve.

SUMMARY OF THE INVENTION

The present invention, accordingly, provides a ball valve assembly in which the noise generated by the flow of the fluid is significantly reduced at relatively small valve openings, low flow rates, and high pressure drops. The assembly of the present invention also achieves maximum flow when the pressure drop is relatively low and eliminates flow separation of the gas. To this end, a ball valve is rotatable in a conduit section to selectively permit fluid flow through the bore to control the flow of the fluid through the conduit section. An insert is disposed in the valve bore and has a plurality of small-diameter passages and a large-diameter passage extending therethrough. The valve is rotated from its closed position to a first, partially-opened, position where the small-diameter passages are in the flow path of the fluid to reduce the flow rate and the noise caused by the fluid flow. The valve can be rotated to a fully-opened position in which the large-diameter passage is in the flow path of the fluid to achieve relatively high flow rates. The insert forms an airfoil surface to prevent separation of the fluid as it passes through the large-diameter passage.

A major advantage is achieved with the ball valve assembly of the present invention since the noise generated by the flow of the fluid is significantly reduced at relatively small valve openings and low flow rates, yet maximum flow is achieved when the pressure drop is relatively low, while flow separation of the gas is eliminated.

DESCRIPTION OF THE PREFERRED EMBODIMENT

Figure 1A:
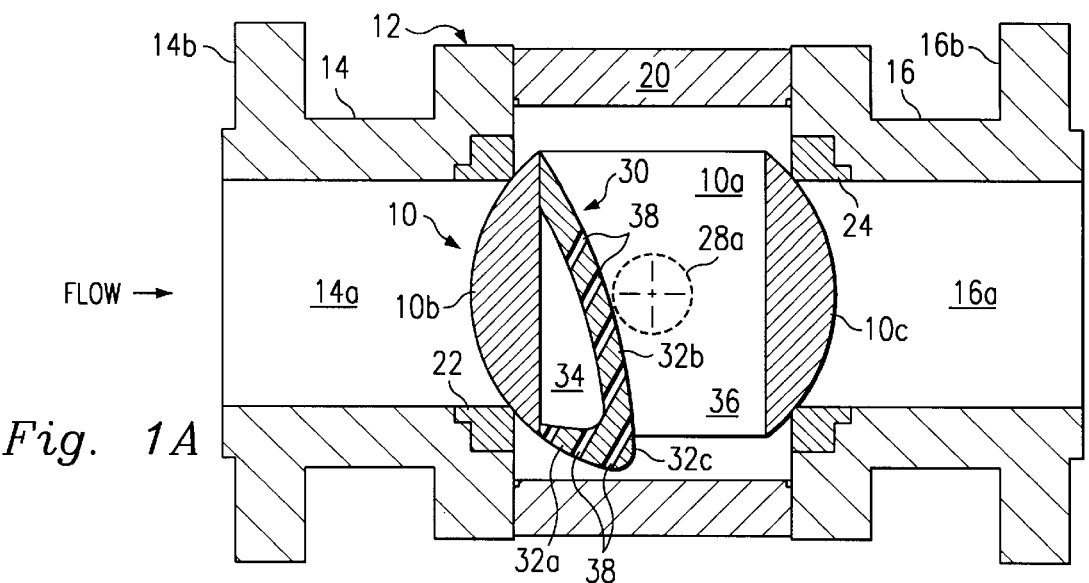
FIGS. 1A–1C are cross-sectional views depicting the ball valve assembly of the present invention in three operating modes.

Referring to FIG. 1A of the drawings, the ball valve assembly of the present invention includes a ball valve 10 disposed in a valve body 12 formed by a cylindrical inlet section 14 having an inlet bore 14a and a circular flange 14b projecting therefrom for connection to a pipe (not shown) for supplying a compressible fluid, such as natural gas, to the inlet section. A cylindrical outlet section 16 is also provided which has an outlet bore 16a and a circular flange 16b projecting therefrom for connection to a pipe (not shown) for receiving the fluid from the outlet section. An outer support ring 20 extends between the sections 14 and 16, with the inner surface of the ring in a spaced relation to the outer surface of the ball valve 10.

A pair of axially-spaced seal assemblies 22 and 24 are mounted in circular notches or grooves, provided in the inner end portions of the inlet section 14 and the outlet section 16, respectively. The support ring 20 is connected between the sections 14 and 16 in any known manner, such as by bolts, or the like (not shown). The support ring 20 and the seal assemblies 22 and 24 will not be described in any further detail since they are conventional.

The valve 10 is in the form of a spherically shaped ball having a central through bore 10a. Thus, two solid surface areas 10b and 10c are defined which, in the closed position of the valve 10 shown in FIG. 1A, block the flow of fluid from the inlet section 14 to the outlet section 16.

A pair of stems (one of which is shown in phantom lines and referred to by the reference numeral 28a in FIGS. 1A), are connected to the outer surface of the ball valve 10 at diametrically opposite portions thereof to enable the ball valve to be rotated in a manner to be described. More particularly, the stems, including the stem 28a, are connected to conventional ancillary equipment (not shown) in a manner to permit rotation of the ball valve 10 about an axis coinciding with the axes of the stems, with the seals 22 and 24 functioning to provide a fluid seal, all in a conventional manner.

Figure 2:
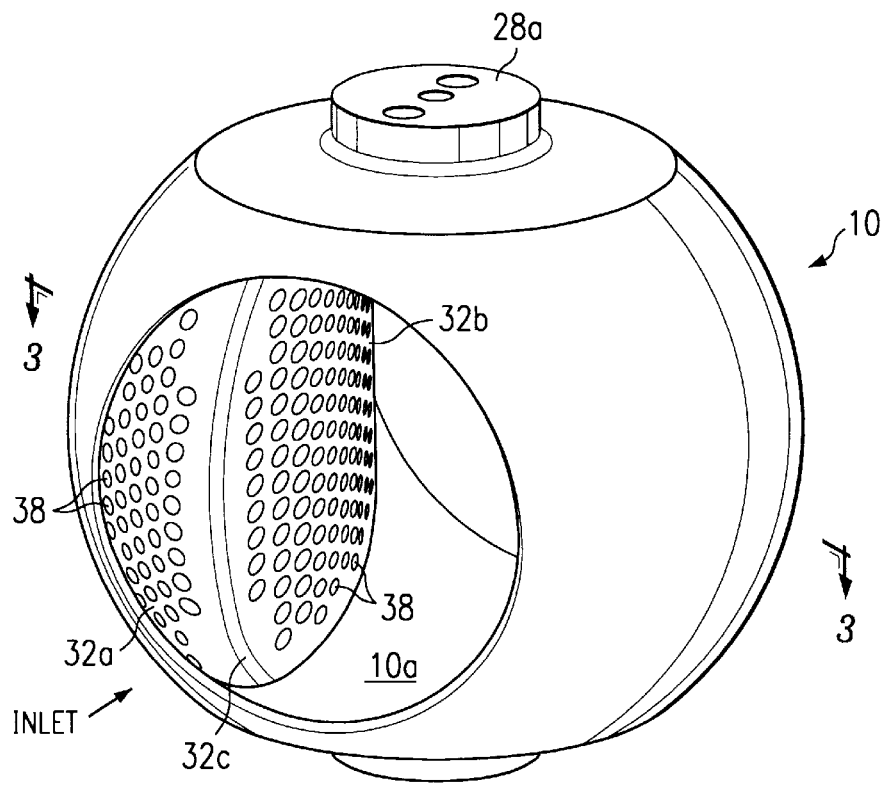
FIG. 2 is an isometric view of the ball valve assembly of FIGS. 1A–1C.
Figure 3:
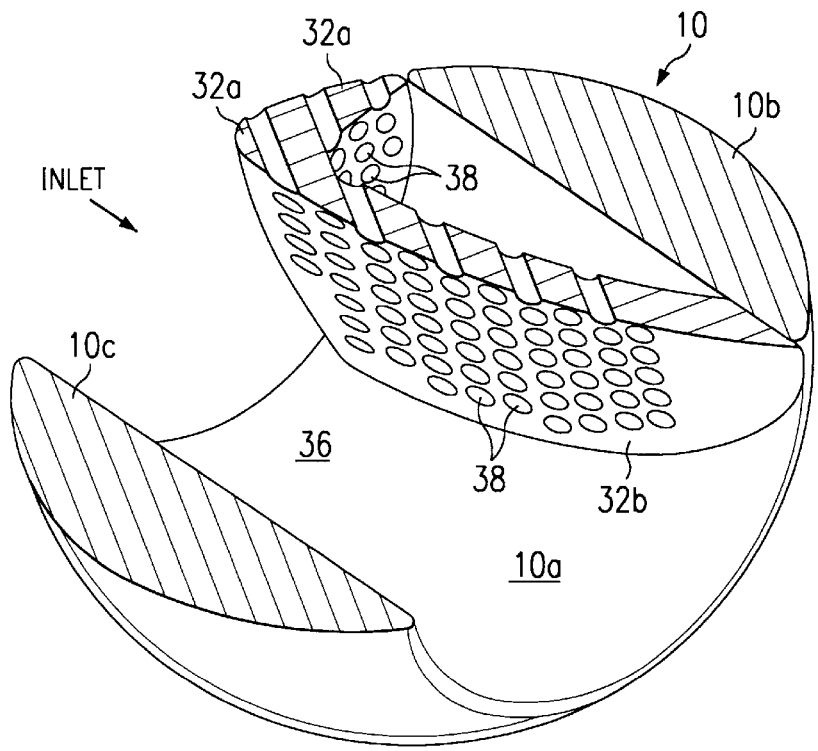
FIG. 3 is a cross-sectional view taken along the plane 3—3 of FIG. 2.

According to a main feature of the present invention, an insert 30 is provided in the bore 10a of the valve 10 and is designed to reduce the noise generated as a result of the flow of fluid through the valve at relatively low flow rates and low valve openings. To this end, and with reference to FIGS. 1A, 2 and 3, the insert 30 is in the form of a plate-like member shaped so to form a relatively short, slightly-curved portion 32a, a second, relatively long, slightly-curved portion 32b extending at an angle to the portion 32a, and an enlarged-width elbow 32c connecting the portions 32a and 32b.

The insert portion 32a is shaped and positioned in the leading, or inlet, end of the bore 10a of the valve 10 and extends substantially perpendicular to the axis of the bore 10a so as to define a continuation of the curved surface of the solid section 10b of the valve 10. The second portion 32b extends from the elbow 32c and curves back to the trailing, or outlet, end of the bore 10a to define, with the portion 32a and the corresponding inner surface of the solid section 10b, an enclosed cavity 34. A relatively large-diameter through passage 36 is defined through the valve bore 10a extending between the insert portion 32b and the corresponding inner surface of the solid section 10c. The insert 30 has a smooth, curved "airfoil" design which permits pressure recovery when fluid flows through the passage 36 in a manner to be explained.

A series of spaced, parallel, relatively small-diameter through passages 38 are formed through the insert portions 32a, 32b and 32c and function to significantly reduce the noise level that would otherwise be generated by the flow of the fluid through the valve bore 10a in accordance with well-established theories as explained above.

The valve 10 is depicted in its closed position in FIG. 1A in which, the solid section 10b blocks the flow of fluid from the inlet bore 14a through the valve 10. In the event fluid flow is desired, the valve 10 is rotated through the valve stems, including the stem 28a, in a clockwise direction as shown by the arrow in FIG. 1B which exposes a portion of the flow passages 38 to the fluid in the bore 14a. A portion of the fluid flows through the passages 38 in the insert portion 32a and into the cavity 34 and then exits the cavity through the passages 38 in the insert portion 32b. This fluid then enters, and passes through, the relatively large passage 36 to the outlet bore 16a.

Another portion of the fluid passes directly from the inlet bore 14a, through a portion of the passages 38 located near the elbow portion 32c of the insert 30 and directly into the passage 36 before passing to the outlet bore 16a. All of the fluid then passes from the outlet bore 16a to an outlet pipe, or the like, connected to the outlet section 16. In this position, significant noise reduction is achieved as a result of all of the fluid passing through one or more of the passages 38 before exiting the valve 10.

Figure 1B:
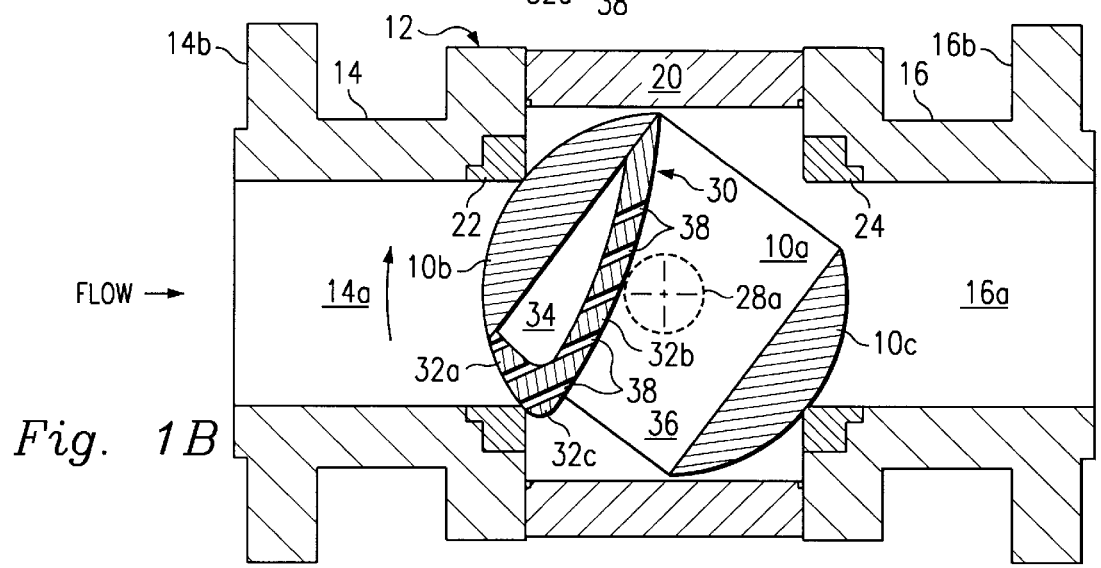
Figure 1C:
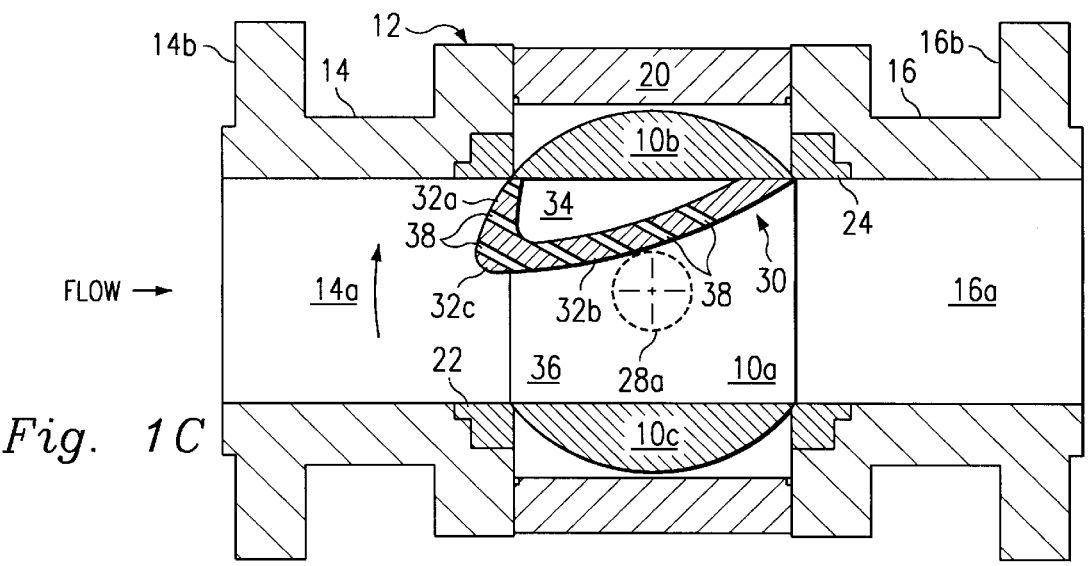

If it is desired to move the valve 10 to its fully opened position, the valve is rotated in the clock-wise direction until the valve reaches the position shown in FIG. 1C. In this position, all of the passages 38 in the insert portion 32a and the elbow 32c, as well as the relatively large passage 36, are exposed to the fluid in the inlet bore 14a. Since the relatively large passage 36 provides the least resistance to fluid flow, the major portion of the fluid flows from the inlet bore 14a, directly through the passage 36 and to the outlet bore 16a. Thus, in the fully opened position of FIG. 1C, relatively high flow capacity is achieved (with reduced noise reduction) since a great majority of the fluid flows through the relatively large passage 36. Due to the smooth "airfoil" design of the insert 30, the fluid "attaches" to the outer surface of the insert as it passes through the valve 10, thus permitting significant pressure recovery.

As a result of all of the foregoing, the ball valve 10a of the present invention can take the position of FIG. 1B to considerably reduce noise at relatively low flow rates and high pressure drops, yet, can take the position of FIG. 1C in response to relatively low pressure drop situations and achieve maximum flow. Also, relatively high efficiencies are obtained by the valve of the present invention since pressure recovery is achieved by virtue of the attached flow described above due to the airfoil design of the insert 30.

It is understood that variations may be made in the foregoing without departing from the scope of the invention. For example, the present invention is not limited to the specific shape of the insert 30 shown and described above. For example, the insert to take a generally conical shape within the scope of the invention. Other modifications, changes and substitutions are intended in the foregoing disclosure and in some instances some features of the invention will be employed without a corresponding use of other features. Accordingly, it is appropriate that the appended claims be construed broadly and in a manner consistent with the scope of the invention.

What is claimed is:

1. A valve assembly for controlling the flow of fluid through a conduit section having an inlet and an outlet, the valve assembly comprising a ball valve having a through bore formed therein, the valve being rotatable in the conduit section to selectively permit fluid flow through the bore to control the flow of the fluid through the conduit section; and an insert disposed in the bore for reducing the noise caused by the fluid flow though the bore, the insert comprising a plate-like member having a plurality of relatively small-diameter passages for receiving the fluid, the plate-like member defining, with a portion of a surface of the valve defining the bore, a relatively large-diameter through passage; the valve being positionable in a first open position in the conduit section so that the fluid flows through the relatively small-diameter passages to reduce the flow rate and the noise generated by the fluid flow, the valve being positionable in a second position in the conduit section so that the fluid flows through the relatively large-diameter passage to increase the flow rate, a portion of the plate-like member forming an airfoil surface to prevent separation of the fluid as it passes through the relatively large-diameter passage.

2. The assembly of claim 1 wherein the fluid flows through the small-diameter passages in the second position of the valve, the majority of the fluid passing through the large-diameter passage.

3. The assembly of claim 1 wherein the plate-like member defines with a corresponding surface of the valve, a cavity, so that, in the first position of the valve, a portion of fluid flows from some of the small-diameter passages in the member, into the cavity, and through other small-diameter passages in the plate-like member.

4. The assembly of claim 1 wherein, upon rotation of the ball valve from its closed position, the valve reaches the first position before the second position.

5. The assembly of claim 4 wherein the second position is the fully open position of the valve.

6. A method of controlling the flow of fluid through a conduit comprising the steps of providing a ball valve with an insert having a plurality of relatively small-diameter passages, rotating the ball valve from a closed position to a first position in which the fluid flows through the small-diameter passages, rotating the ball valve to a second position in which the valve defines, with a corresponding surface of the valve, a large-diameter passage through which the fluid flows, and forming an airfoil surface to prevent separation of the fluid as it passes through the large-diameter passage.

7. The method of claim 6 wherein the fluid also flows through the small-diameter passages in the second position of the valve, the majority of the fluid passing through the large-diameter passage.

8. The method of claim wherein, upon rotation of the ball valve from its closed position, the valve reaches the first position before the second position.

9. The method of claim 6 wherein the second position is the fully open position of the valve.

\* \* \* \* \*